United States Patent
Tuggle

(10) Patent No.: US 7,231,949 B2
(45) Date of Patent: Jun. 19, 2007

(54) WHEEL AND TIRE ASSEMBLY FOR RECREATIONAL VEHICLES

(75) Inventor: William E. Tuggle, Norfolk, VA (US)

(73) Assignee: Westco, Inc., Norfolk, VA (US)

( * ) Notice: Subject to any disclaimer, the term of this patent is extended or adjusted under 35 U.S.C. 154(b) by 0 days.

(21) Appl. No.: 11/186,920

(22) Filed: Jul. 22, 2005

(65) Prior Publication Data

US 2006/0076096 A1   Apr. 13, 2006

Related U.S. Application Data

(60) Provisional application No. 60/589,835, filed on Jul. 22, 2004.

(51) Int. Cl.
*B60B 21/10* (2006.01)

(52) U.S. Cl. .................. 152/375; 152/379.4; 152/384; 301/37.22; 301/64.302; 301/95.101; 301/95.11

(58) Field of Classification Search ............. 301/37.22, 301/37.24, 64.303, 95.101, 95.11; 152/375, 152/379.3, 379.4, 379.5, 384, 396, 402, 403, 152/516, 520

See application file for complete search history.

(56) References Cited

U.S. PATENT DOCUMENTS

| 1,394,252 | A | * | 10/1921 | Costello | 152/402 |
| 2,097,942 | A | * | 11/1937 | Whitney | 188/18 A |
| 2,713,373 | A | * | 7/1955 | Daugherty | 152/384 |
| 3,154,126 | A | * | 10/1964 | Katter | 152/9 |
| 3,318,357 | A | * | 5/1967 | Schwall, Jr. | 152/453 |
| 3,930,527 | A | * | 1/1976 | French | 152/520 |
| 4,253,512 | A | * | 3/1981 | Yoshioka et al. | 152/452 |
| 4,538,657 | A | * | 9/1985 | Tuggle | 152/375 |
| 4,693,696 | A | * | 9/1987 | Buck | 446/224 |
| 6,279,631 | B1 | * | 8/2001 | Tuggle | 152/375 |

FOREIGN PATENT DOCUMENTS

JP   55-59006   *   5/1980

* cited by examiner

*Primary Examiner*—Russell D. Stormer
(74) *Attorney, Agent, or Firm*—Connolly Bove Lodge & Hutz LLP

(57) ABSTRACT

A wheel and tire assembly for recreational vehicles, such as mountainboards, motorized carts and pedaled carts is provided. The tire comprises a tire made of substantially inelastic material that will not stretch under a load. Thus, the tire will flatten under a load to provide a high level of traction on soft and irregular surfaces, as well as on hard and flat surfaces. The tire includes protrusions on its inner diameter surface for securely engaging the wheel. The wheel includes a rim that supports the tire and includes protrusions for engaging the protrusions of the tire in an interdigitating manner. The interdigitating engagement of the protrusions on the tire with the protrusions on the wheel prevents slippage and rotation of the tire relative to the wheel. The wheel also includes support flanges that extend radially inward from the rim in order to protect the tire from damage as the tire deforms under a load.

22 Claims, 6 Drawing Sheets

WHEEL AND TIRE ASSEMBLY FOR RECREATIONAL VEHICLES

This application claims the benefit of U.S. provisional application No. 60/589,835 filed Jul. 22, 2004.

BACKGROUND OF THE INVENTION

Recreational vehicles, such as mountainboards, motorized carts and pedal-operated carts are operated over a variety of terrains. These terrains can include many different types of surfaces, including hard, soft, smooth and irregular (i.e., rough or bumpy) surfaces. It is difficult to design wheel and tire assemblies that provide optimum performance characteristics on a variety of surfaces. Therefore, the wheels and tires that are provided on recreational vehicles are often designed for optimum performance on a particular type of surface only, or are designed to provide compromised performance on a variety of surfaces.

Traditional wheel and tire assemblies for recreational vehicles include a wheel and a tubed or tubeless pneumatic tire mounted on the wheel. To ensure adequate load bearing capacity, to retain the tires on their rims and to ensure that the tires resist the torque applied to rotate and stop rotation of the wheels and tires, the tires are typically constructed of tough, relatively hard materials and are inflated to high operating pressures, typically in excess of 10 psi. When the typical wheel and tire assemblies are mounted on a vehicle and subjected to an axial load by a rider/operator, the tires flatten only very slightly and generally retain the appearance of deflated, unloaded tires. As a result, the contact areas between the tires and the support surfaces underlying the tires are small, so that the pressure per unit area on the support surfaces is high, which causes the wheels and tires to sink partially into soft support surfaces such as sand and loose dirt. The high operating pressures to which the tires are inflated also make the tires less yielding to obstacles, bumps and irregularities on the support surface, which can lead to a bumpy ride, and thus a loss of speed while traversing terrain and diminished control of the vehicle by a rider/operator.

The invention aims to provide an improved wheel and tire assembly for recreational vehicles to allow for optimum performance on a wide variety of surfaces. Additionally, it is an object of the invention to provide a wheel and tire assembly wherein the tire is securely mounted to the wheel without being permanently attached to the wheel, in order to ensure safe operation and ease of replacement for the tire and/or wheel. The invention further aims to provide a wheel and tire assembly that can be manufactured relatively quickly and inexpensively.

BRIEF SUMMARY OF THE INVENTION

Recognizing that recreational vehicles traverse surfaces having a variety of compositions and characteristics, and that recreational vehicles are also subjected to a wide range of loads during operation, a need exists for a wheel and tire assembly that can perform well on various types of surfaces and under various loads. The invention provides an improved wheel and tire assembly including a tire-supporting rim and a low-pressure, all-terrain tire that provides superior performance regardless of variations in terrain or load. The wheel and tire assembly also provides secure attachment of the tire to the wheel and protection of the tire from potential damage during extreme acceleration, braking and turning of vehicles.

The tire of the invention comprises a substantially torus-shaped member (or "torus") constructed of substantially inelastic material that will not deform at temperatures up to at least 225° F. The tire includes an inner diameter wall portion for engaging the rim and an outer diameter wall portion for contacting a support surface. The tire can flatten under load (i.e., axial load) to facilitate movement of the tire over various types of surfaces. Due to flattening of the tire, the tire is able to easily traverse soft and irregular surfaces as well as smooth and hard surfaces.

The inner diameter wall portion of the tire and the outer surface of the rim include interdigitating protrusions for securing the wheel and tire together and preventing rotation of the tire relative to the wheel. The rim further includes flanges extending radially inward towards the center of the wheel to support side portions of the tire as the tire flattens under load with side torque, such as when a rider or operator is turning the vehicle on which the tire is mounted. The flanges therefore prevent the sidewall portions of the tire from incurring damage that could otherwise be caused by extreme pressure against outer edges of the rim.

Various objects and advantages of the present invention will become readily apparent to those skilled in the art from the following detailed description, wherein it is shown and described only exemplary embodiments of the invention. As will be realized, the invention is capable of modification in various obvious respects without departing from the scope of the invention. Accordingly, the drawings and description are illustrative in nature and are not intended to be restrictive.

DETAILED DESCRIPTION OF THE INVENTION

A wheel and tire assembly according to the invention includes a tire made of a flexible, substantially inelastic material and a wheel adapted to support the tire for rotation. The tire and wheel of the present invention, when secured together, securely engage one another to resist relative rotation between the tire and the wheel. By definition, the tire may deform under load, but will not stretch, or will stretch very little under load. This characteristic is opposite to the tendency of elastic materials, such as rubber or rubber-like materials, to stretch under load.

Polyurethane is an example of a material that may be utilized in the construction of the tire. The polyurethane may be thermoplastic and may additionally be a polyether-based grade polyurethane, such as TEXIN 985U polyurethane available from the Bayer corporation. This polyurethane has a Shore hardness of about 85 A. Naturally, other polyurethanes or other materials having similar characteristics, such as Shore hardness, abrasion resistance, impact strength, toughness, flexibility, temperature resistance and resistance to UV exposure could be utilized.

The wall thickness of a tire according to the present invention can vary greatly with the diameter and/or width of the tire as well as the particular application for which the tire is intended. Due to the nature of the molding process for making a tire according to the invention, the entire wall of the tire is typically uniformly thick. However, the tire may be differentially thick.

A tire according to the present invention may be utilized in extreme temperatures. For example, a tire, such as a tire made of polyurethane, could be used on hot concrete, asphalt, or metal, or could be left inside hot vehicles in the sun, where temperatures can exceed 225° F. without experiencing deformation. Many plastic tires have limits on the conditions in which they may be utilized. For example, an elastomeric plastic tire may begin to deform at temperatures of about 120° F. to about 150° F. Since concrete, asphalt, metal and other surfaces may exceed 120° F. in summer seasons, such elastomeric plastic tires could not be utilized on such surfaces. Additionally, potential storage areas, such as the interior of a motor vehicle, can exceed 225° F. in the summer, and an elastomeric plastic tire would deform under such conditions.

Figure 1:
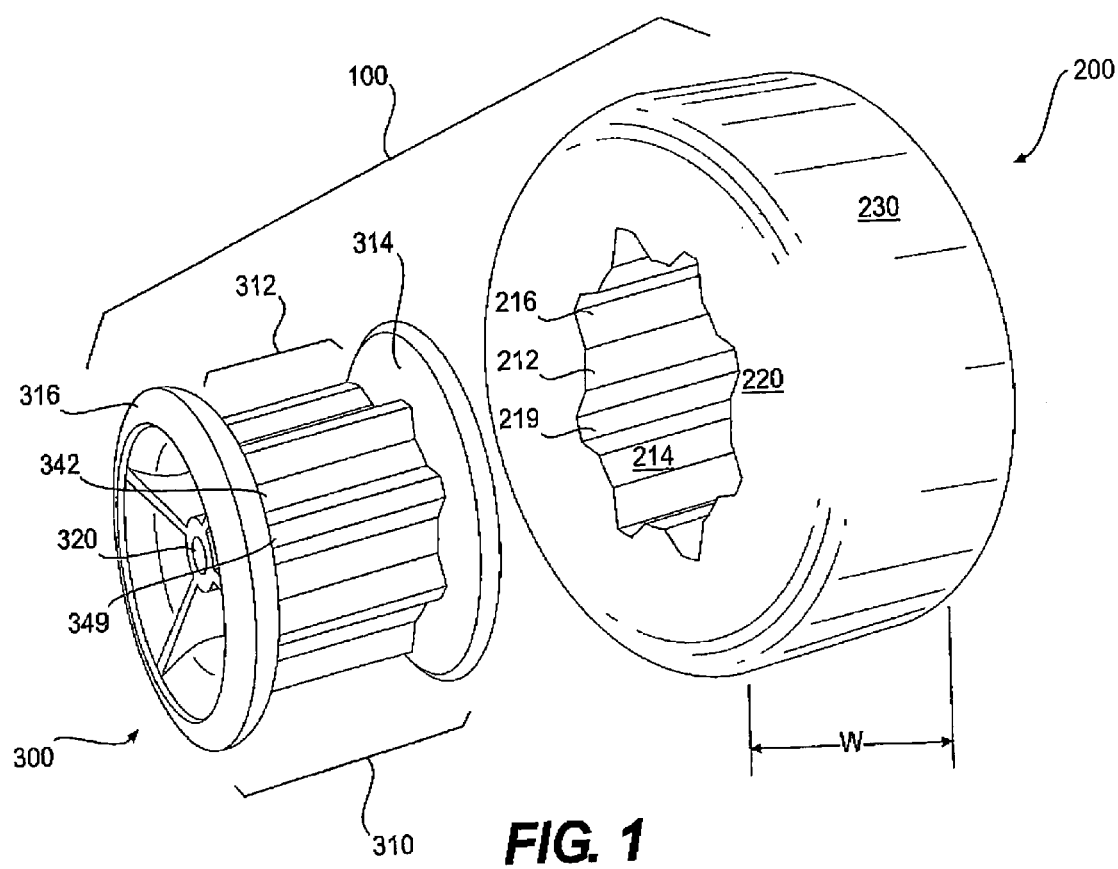
FIG. 1 is a perspective view of a disassembled wheel and tire assembly, with end caps removed from the wheel, according to one embodiment.
Figure 2:
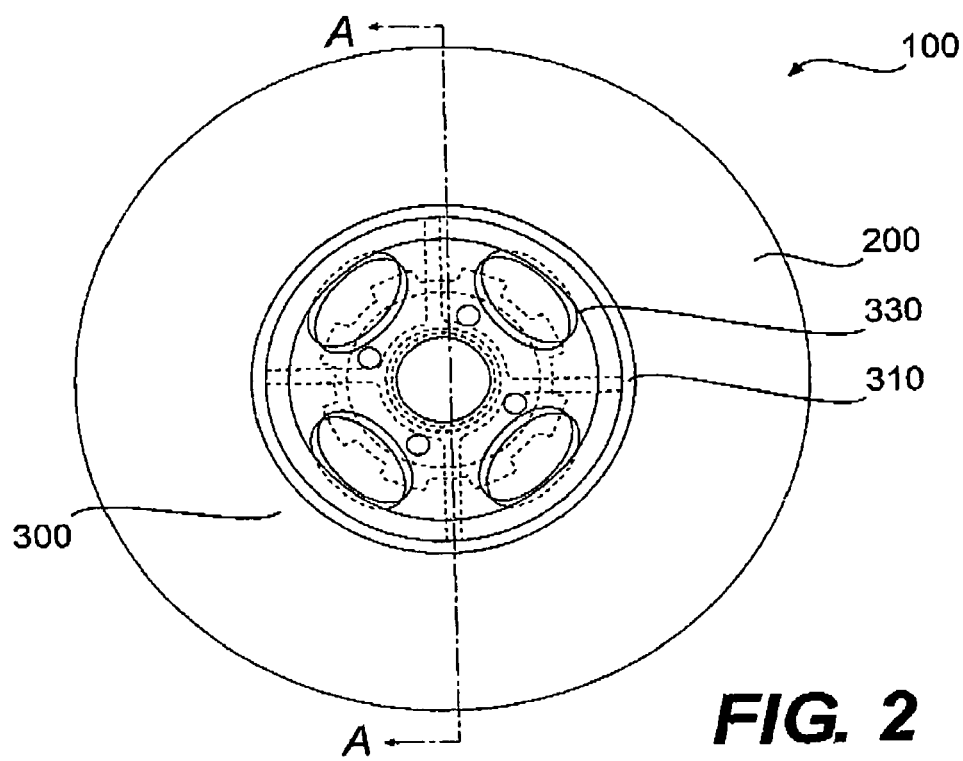
FIG. 2 is a partially transparent side view showing the wheel and tire assembly of FIG. 1 in its fully assembled form.

A wheel and tire assembly 100 according to an embodiment of the present invention is shown in FIG. 1. The assembly 100 includes a low pressure tire 200 and a wheel 300 for supporting the tire 100. The tire 200 is substantially torus-shaped and is constructed of substantially inelastic material, such as polyurethane as described above. The tire 200 is described as "substantially torus-shaped" because it does not have a perfect donut shape, but generally has a modified donut shape that is formed to fit supporting surfaces of the wheel 300, as shown best in FIGS. 3 and 4.

Figure 3:
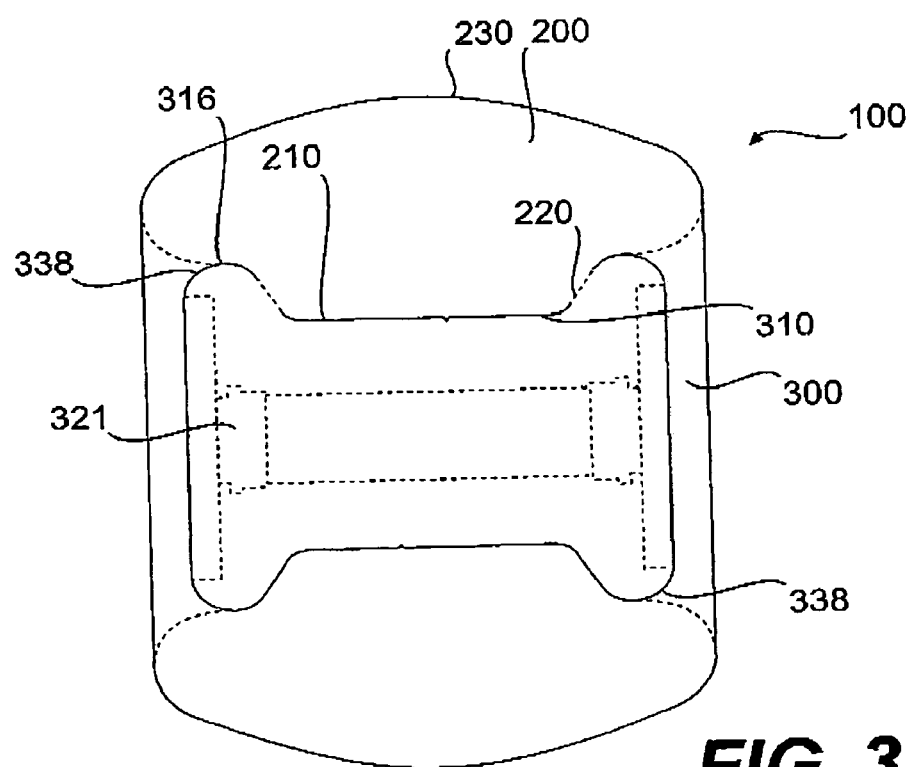
FIG. 3 is a cross-sectional view of the wheel and tire assembly of FIG. 1, taken along line A—A.
Figure 5:
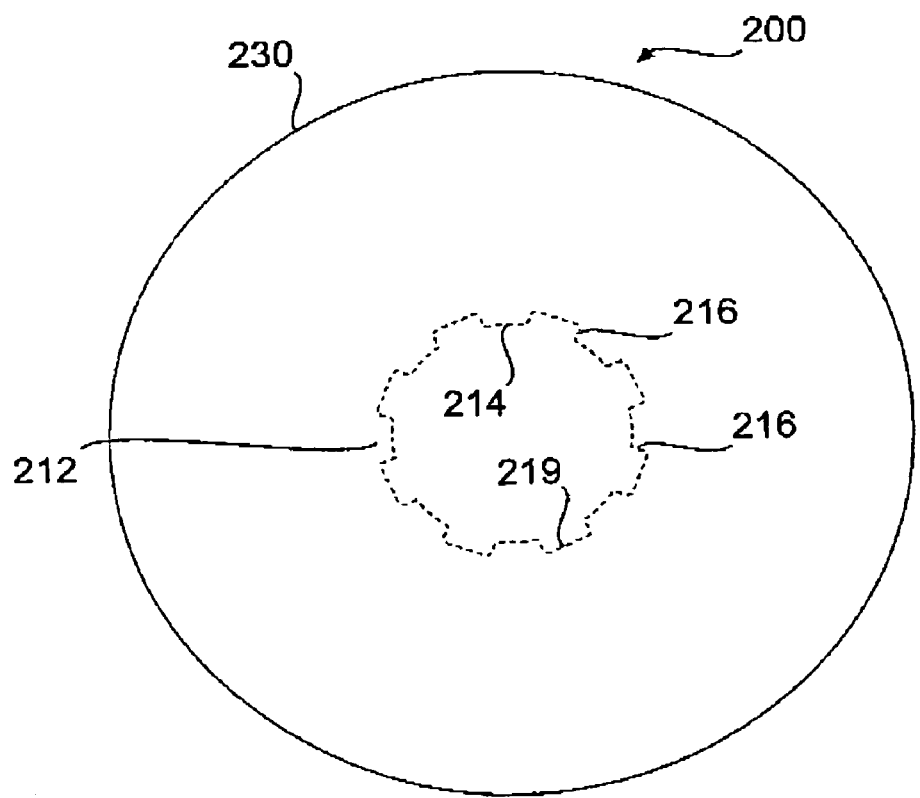
FIG. 5 is a side view of the tire of FIG. 1.

Referring to FIG. 3, the cross section of tire 200 is substantially annular in shape. The tire 200 includes an inner diameter wall portion 210 and sidewall portions 220 for engaging a tire supporting rim 310 of the wheel 300, and an outer diameter wall portion 230 for contacting a supporting surface on which the tire supports the vehicle (not shown) for rolling motion. As illustrated in FIGS. 1 and 5, the inner diameter wall portion 210 includes transverse ribs or protrusions 212 extending in the direction of the axial width W of the tire 200. Preferably, each protrusion 212 extends across nearly the entire axial width of the inner diameter wall portion 210, and includes a substantially flat top surface 214 and two side surfaces 216 oriented substantially perpendicular to the top surface 212. Adjacent protrusions 212 are separated by recesses 219. Preferably, the protrusions 212 are disposed around the entire periphery of the inner diameter wall portion 210. The exterior surface of the outer diameter wall portion 230 may be smooth, or it may have a tread pattern suitable for a particular application.

The tire 200 may be substantially or entirely free from reinforcing fabrics or cords. However, such reinforcing materials may be included in areas where the tire 200 engages the wheel 300 in order to reinforce those areas. The absence of any reinforcing material may help the tire 200 to flatten or deform as desired under load.

Figure 4:
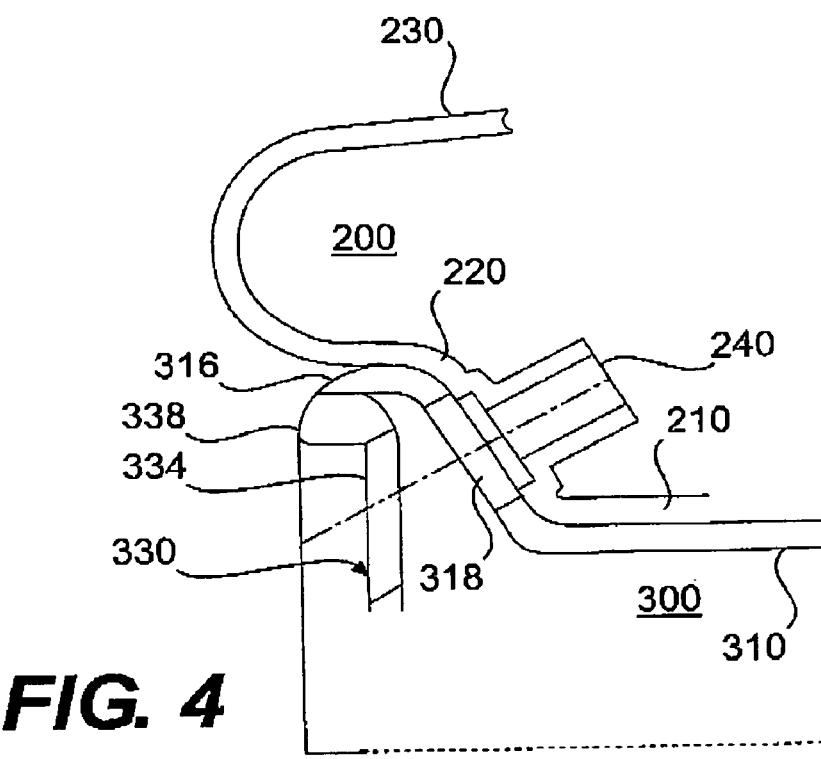
FIG. 4 is a cut-away view of the cross-section of FIG. 3, showing the wheel and tire in more detail.

As indicated in FIG. 4, the tire 200 may also include a sealable opening 240 for inflating and deflating the tire. The sealable opening 240 may be any typical structure for inflating a tire or other inflatable structure. For example, the sealable opening 240 could include a conventional valve stem member or needle valve such as the type used in inflatable balls. Preferably, the sealable opening 240 is located in a lower part of a sidewall portions 220 such that it is recessed behind the wheel 300.

As previously stated, the tire 200 typically deforms but does not stretch when encountering an obstacle under a load. When inflated to lower pressure levels, the tire may spread out under load to facilitate movement over soft or irregular support surfaces. Typically, in such conditions, the tire 200 may be inflated to a pressure of no more than about 1 psi to help insure that the tire will flatten to help provide sufficient contact surface and reduce rolling friction between the tire and the soft or irregular support surface. The tire 200 may thereby permit a vehicle or device on which the tire is mounted to move easily over soft or irregular support surfaces. The contact surface of the tire may increase as a load on the tire increases. Although the tire 200 may be inflated to pressures up to 6 psi, pressures as low as 1 psi to 4 psi would be suitable use on soft or irregular surfaces. Generally speaking, when the tire 200 is inflated to lower pressures, the tire is better suited for use on soft and irregular surfaces, as the tire 200 will flatten more under a load than it would when inflated to higher pressures. By flattening, the tire 200 provides an enlarged contact area between its outer diameter surface 230 and the underlying support surface.

Typically, the tire 200 is formed by a blow molding method. Blow molding is typically more economical, more efficient and less labor intensive than other methods of forming flexible polyurethane products. However, other suitable methods may be used to make such a tire.

Figure 6:
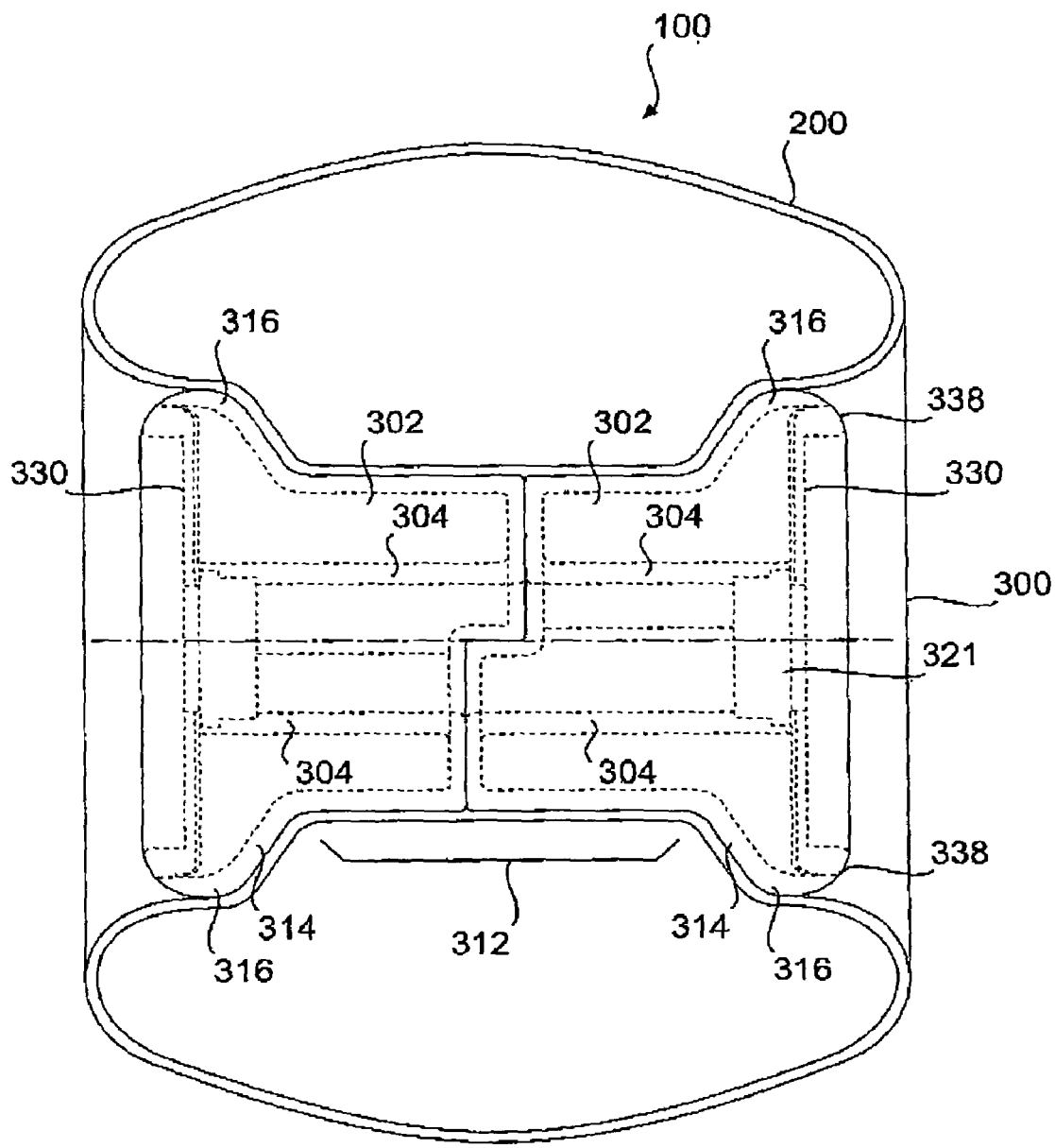
FIG. 6 is a more detailed cross-sectional taken along line B—B of FIG. 2.

Turning to FIG. 6, the wheel 300 is constructed of two mating axial wheel halves 302 that are adapted to be fastened to each other and two end caps 330 that are each adapted to be fastened to a respective one of the wheel halves 302. The wheel 300 includes bolt holes 304 extend through both wheel halves 302. Each end cap includes an axle hole 331 for receiving the axle (not shown) and bolt holes 332 that are adapted to be aligned with the bolt holes 304. Bolts (not shown) may be inserted through the bolt holes 304 and 332 to assemble the wheel 300.

With reference to FIGS. 1 and 6, the wheel 300 includes the aforementioned tire supporting rim 310 connected to a hub 320 for receiving an axle (not shown). Bearings (not shown) are retained inside the hub 320 in bearing seats 321, shown in FIGS. 3 and 6. The rim 310 includes a cylindrical center section 312 for engaging the inner diameter surface 210 of the tire, a pair of substantially conical portions 314 extending from opposite ends of cylindrical center section 312 for supporting a lower section of the tire sidewall portion 220, and rounded outer lips 316 extending from the conical portions 314. Additionally, as shown in FIG. 4, at least one of the conical portions 314 may include an opening 318 providing access to the sealable opening 240 of the tire. The end caps 330 may also include one or more openings 334 (shown in FIGS. 4 and 8a–8b) that can be aligned with the opening 318 in order to allow access to the sealable opening 240 when the end cap 330 is in place.

Figure 8A:
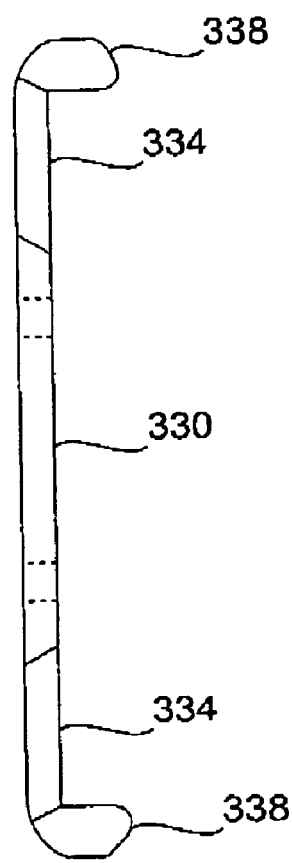
FIGS. 8A and 8B show an end cap of the wheel of FIG. 1.
Figure 8B:
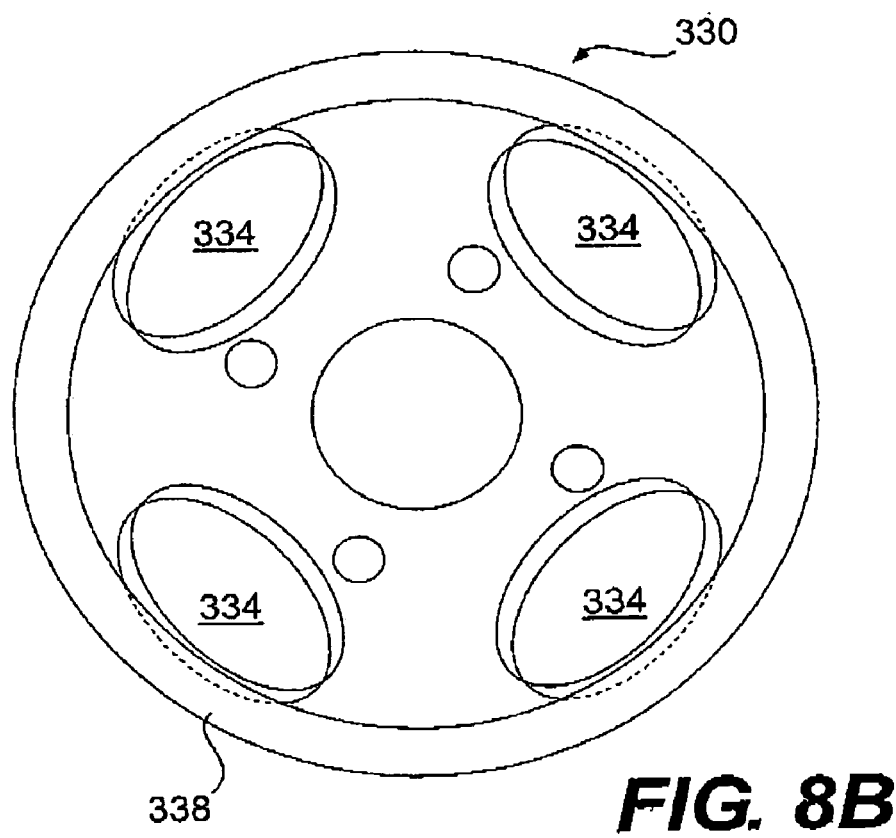

Referring to FIG. 8a, each end cap 330 includes a rounded lip 336 at its outer circumference. When the end caps 330 are attached to the wheel halves 302, each rounded lip 338 mates with an outer lip 316 of the rim 310 to form a support flange that extends radially inward from the outer diameter of the wheel 300 (see FIGS. 3 and 8a). The end caps 330 also secure bearings 321 within the hub 320.

Figure 7:
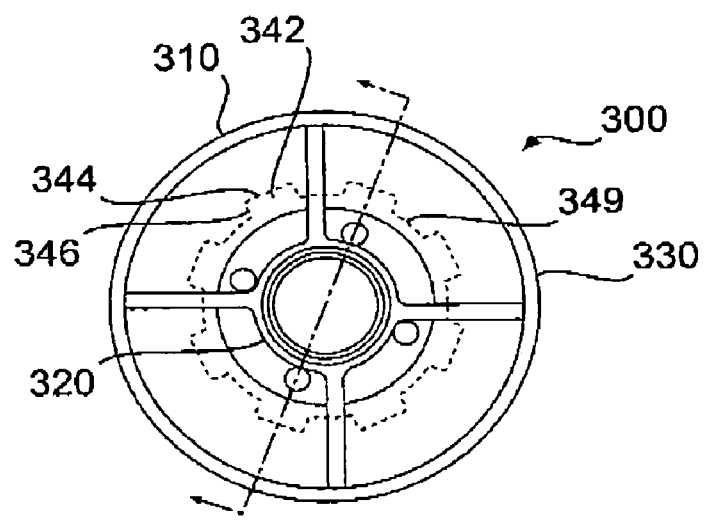
FIG. 7 is a partially transparent side view of the wheel of FIG. 1 with the end caps removed.

As best shown in FIGS. 1 and 7, the center section 312 of the rim 310 includes transverse ribs or protrusions 342 extending in the direction of the axial width of the wheel 300. Preferably, each protrusion 342 extends across nearly the entire width of center section 312, and includes a substantially flat top surface 344 and two side surfaces 346 oriented substantially perpendicular to the top surface 344. Adjacent protrusions 342 are separated by recesses 349. Preferably, the protrusions 342 are disposed around the entire periphery of the center section 312.

As shown in FIGS. 3 and 4, when the assembly 100 is fully assembled, the inner diameter wall portion 210 of the tire 200 is supported on the wheel 300 such that the center section 312 and conical portions 314 of the rim 310 secure the tire 200 in place. Each protrusion 212 of the tire 200 is received within a recess 349 of the rim center section 312, and the protrusions 342 of the rim center section 312 are received within the recesses 219 tire 200. Thus, the protrusions 212 and 342 engage each other in an interdigitating or intermeshing manner. To ensure optimum engagement between the protrusions 212 and 342, it is generally preferable that the side engaging surfaces 216 and 346 be within the range of about 0.25 inches to about 0.50 inches in depth. However, the depth of the surfaces 216 and 346 may be outside this range in some applications, depending on the size of the tire 200 and the wheel 300.

The intermeshing engagement of the protrusions 212 and 342 positively secures the tire 200 and wheel 300 together and resists rotation and slippage of the tire 200 relative to the wheel 300 during acceleration and braking of the vehicle or device to which the assembly 100 is mounted. As a result of the interdigitating arrangement of the protrusions 212 and 342, the tire 200 is securely mounted on the wheel 300 without requiring the tire 200 to be glued, bonded, fused or otherwise permanently attached to the wheel 300.

The support flanges 338, shown best in FIGS. 3 and 6, serve to further support the tire sidewall portions 220 under a load when side torque is applied to the tire 200. Under a side torque load, such as during turning of the vehicle or device on which the assembly 100 is mounted, the tire 200 may deform axially by a significant amount, in addition to flattening. In such circumstances, if there were no means for further supporting the tire 200, part of the inner diameter wall portion 210 of the tire 200 might deform axially inward and rub against edges of the rim 310 or other parts of the wheel 300. Such rubbing could result in rapid wear and damage to the tire 200, including blowouts that could cause the operator of the vehicle to have a serious accident. However, according to the present invention, the rounded, radially inward-extending support flanges 338 will prevent the tire sidewall portions 220 from deforming excessively in the axially inward direction. The flanges 338 are further advantageous in that they protect the tire 200, without requiring extension of the rim 310 in the axial direction, thereby making the wheel 300 more compact in width.

Figure 9:
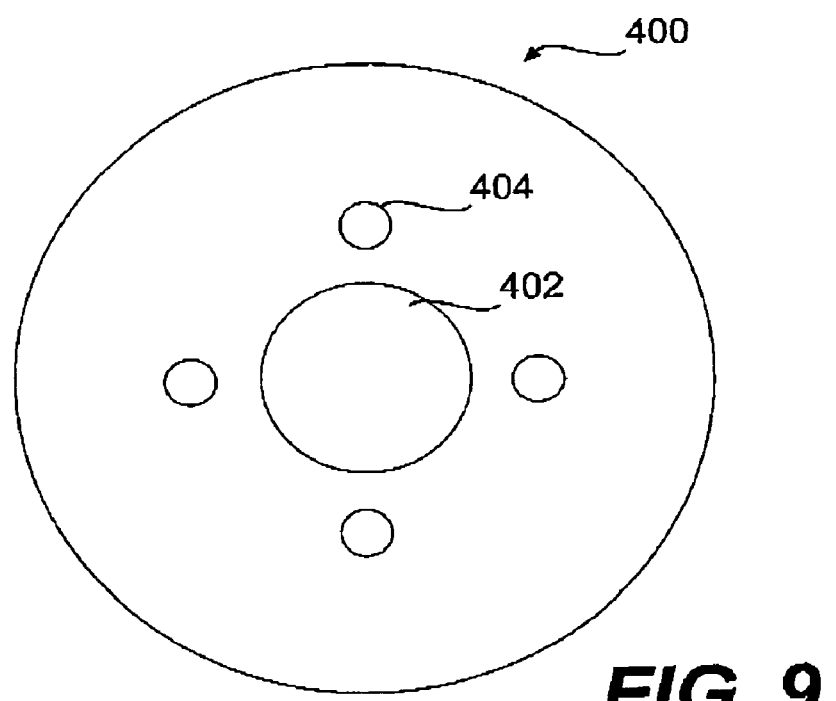
FIG. 9 shows a disc brake for the assembly of FIG. 1.

FIG. 9 shows a brake disc 400 which can be mounted to the wheel 300. The brake disc 400 includes axle hole 402 for receiving the axle (not shown) and bolt holes 404 that can be aligned with bolt holes 304 and 332 for fastening the brake disc 400 to the wheel 300. The brake disc may be part of a braking system for stopping rotation of the wheel 300.

Although the foregoing describes preferred embodiments of the invention, it should be understood that the invention is capable of various other combinations and modifications within the scope of the invention disclosed herein. Accordingly, the embodiments described hereinabove are intended to be illustrative, and are not intended to limit the invention to the form disclosed herein. Thus, it is understood that the invention is covered by the following claims.

I claim:

1. A wheel for a low pressure tire comprising:
    a hub for receiving an axle;
    a tire supporting rim connected to said hub, the tire supporting rim including a cylindrical center section, conical portions extending from opposite sides of the cylindrical center section and rounded lips extending from said conical portions;
    tire supporting flanges extending radially inwardly from said rounded lips;
    transverse protrusions disposed on an outer diameter surface of the rim and extending in a direction of an axial width of the wheel; and
    end caps having an outer lip adapted to mate with said rounded lips to form said tire supporting flanges, wherein said end caps are adapted to retain bearings within said hub.

2. The wheel of claim 1, wherein each of the transverse protrusions extends substantially entirely across the cylindrical center section and includes a substantially flat top surface and two side surfaces disposed substantially perpendicular to the top surface.

3. The wheel of claim 1, wherein the wheel is adapted for use on a mountainboard.

4. The wheel of claim 1, wherein the wheel is adapted for use on a motorized cart.

5. The wheel of claim 1, wherein the wheel is adapted for use on a pedal-operated cart.

6. The wheel of claim 1, wherein the wheel is constructed of two axial wheel halves, wherein said axial wheel halves are adapted to be fastened together.

7. A wheel and tire assembly comprising:
    a tire formed as a substantially torus-shaped member, said tire comprising:
        an inner diameter surface for engaging a tire supporting rim;
        sidewall portions;
        an outer diameter surface for contacting a support surface;
        first transverse protrusions disposed on the inner diameter surface and
    extending in a direction of an axial width the tire; and
    a wheel comprising:
    a hub for receiving an axle;
    a tire supporting rim connected to said hub, the tire supporting rim including a cylindrical center section, conical portions extending from opposite sides of the cylindrical center section and rounded lips extending from said conical portions;
    tire supporting flanges extending radially inwardly from said rounded lips;
    second transverse protrusions disposed on an outer diameter surface of the rim and extending in a direction of an axial width of the wheel, wherein said first transverse protrusions and said second transverse protrusions engage each other in an interdigitating fashion, and wherein said tire supporting flanges are adapted to support said sidewall portions as side torque is applied to said tire; and
    end caps having an outer lip adapted to mate with said rounded lips to form said tire supporting flanges, wherein said end caps are adapted to retain bearings within said hub.

8. The wheel and tire assembly of claim 7, wherein said tire flattens under a load to facilitate movement of the tire over soft or irregular support surfaces, and wherein the substantially inelastic material will not deform at a temperature of 225° F.

9. The wheel and tire assembly of claim 7, wherein the substantially inelastic material is polyurethane.

10. The wheel and tire assembly of claim 7, wherein the substantially inelastic material is a material having a Shore hardness, elasticity, flexibility, chemical tolerance and temperature resistance similar to polyurethane.

11. The wheel and tire assembly of claim 7, wherein the outer diameter surface is substantially free of reinforcing fabrics and reinforcing cords.

12. The wheel and tire assembly of claim 7, wherein the tire is inflated to a pressure of about 1 psi to about 4 psi.

13. The wheel and tire assembly of claim 7, wherein the tire flattens under a load but does not stretch, whereby upon further inflation the tire will not expand substantially outboard.

14. The wheel and tire assembly of claim 7, wherein the tire deforms but does not stretch upon encountering an obstacle under a load.

15. The wheel and tire assembly of claim 7, wherein the tire is blow molded.

16. The wheel and tire assembly of claim 7, wherein each of the first transverse protrusions extends substantially across an axial width of the tire and has a substantially flat top surface and two side surfaces disposed substantially perpendicular to the top engaging surface.

17. The wheel and tire assembly of claim 7, wherein the wheel further comprises support flanges connected to the conical portions and extending radially inward from the conical portions toward a rotational axis of the wheel.

18. The wheel of claim 7, wherein each of the second transverse protrusions extends substantially entirely across the cylindrical center section and has a substantially flat top surface and two side surfaces disposed substantially perpendicular to the top engaging surface.

19. The wheel of claim 7, wherein the wheel and tire assembly is adapted for use on a mountainboard.

20. The wheel of claim 7, wherein the wheel and tire assembly is adapted for use on a motorized cart.

21. The wheel of claim 7, wherein the wheel and tire assembly is adapted for use on a pedal-operated cart.

22. The wheel of claim 7, wherein the wheel is constructed of two axial wheel halves, wherein said axial wheel halves are adapted to be fastened together.

* * * * *